Jan. 18, 1966    J. T. YOVANOVICH    3,229,598
METHOD OF MANUFACTURE OF CAN BODIES AND APPARATUS THEREFOR
Filed June 3, 1963    2 Sheets-Sheet 1
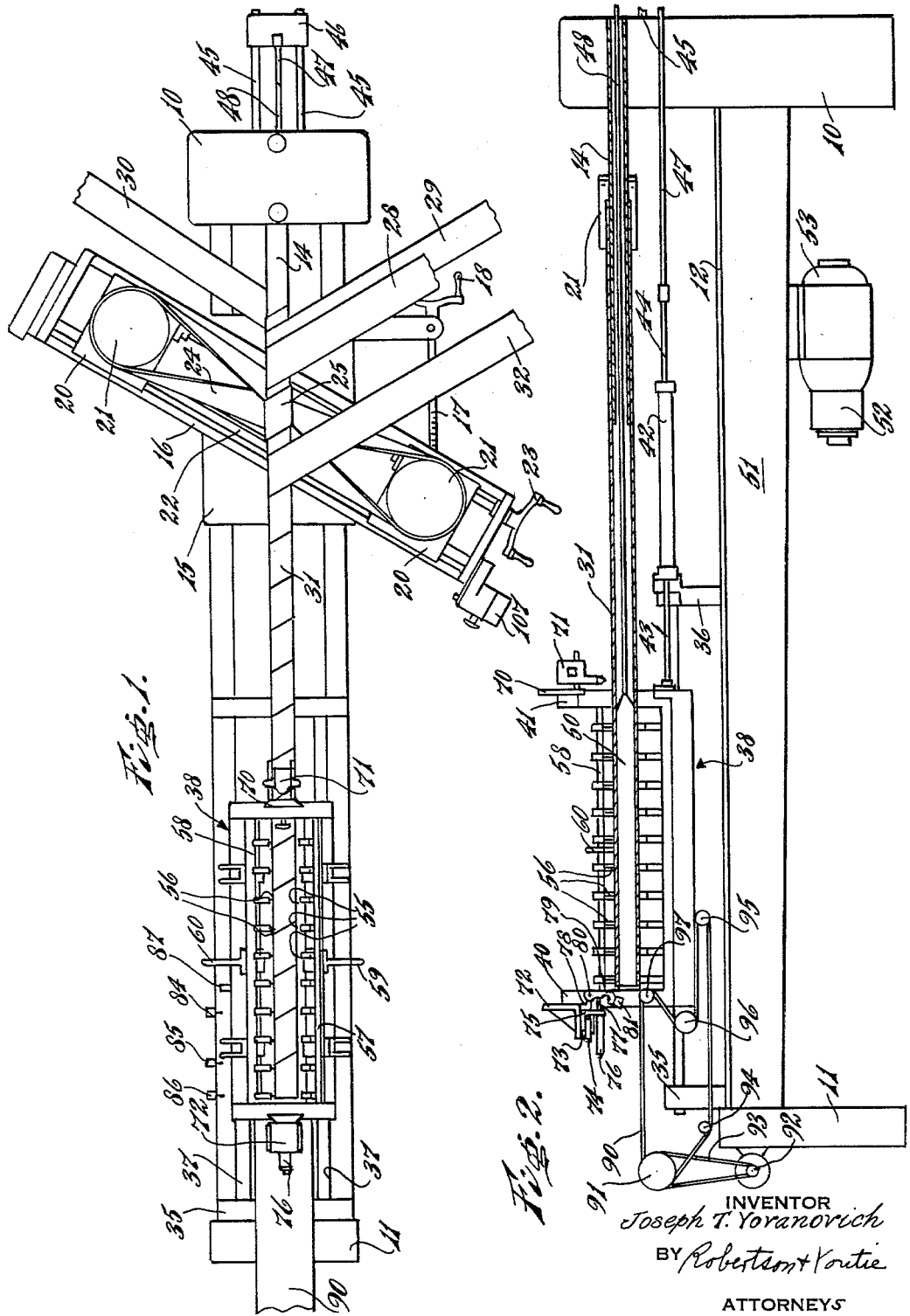
INVENTOR
Joseph T. Yovanovich
BY Robertson & Koutie
ATTORNEYS Jan. 18, 1966   J. T. YOVANOVICH   3,229,598
METHOD OF MANUFACTURE OF CAN BODIES AND APPARATUS THEREFOR
Filed June 3, 1963   2 Sheets-Sheet 2
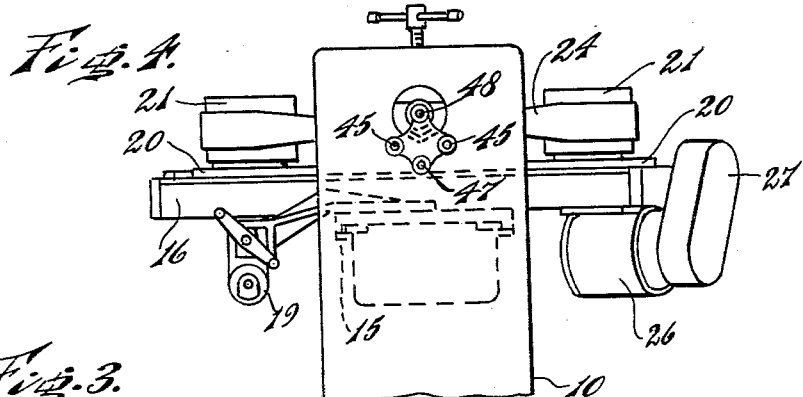
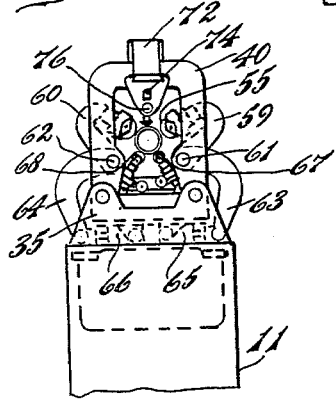
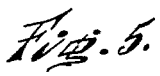
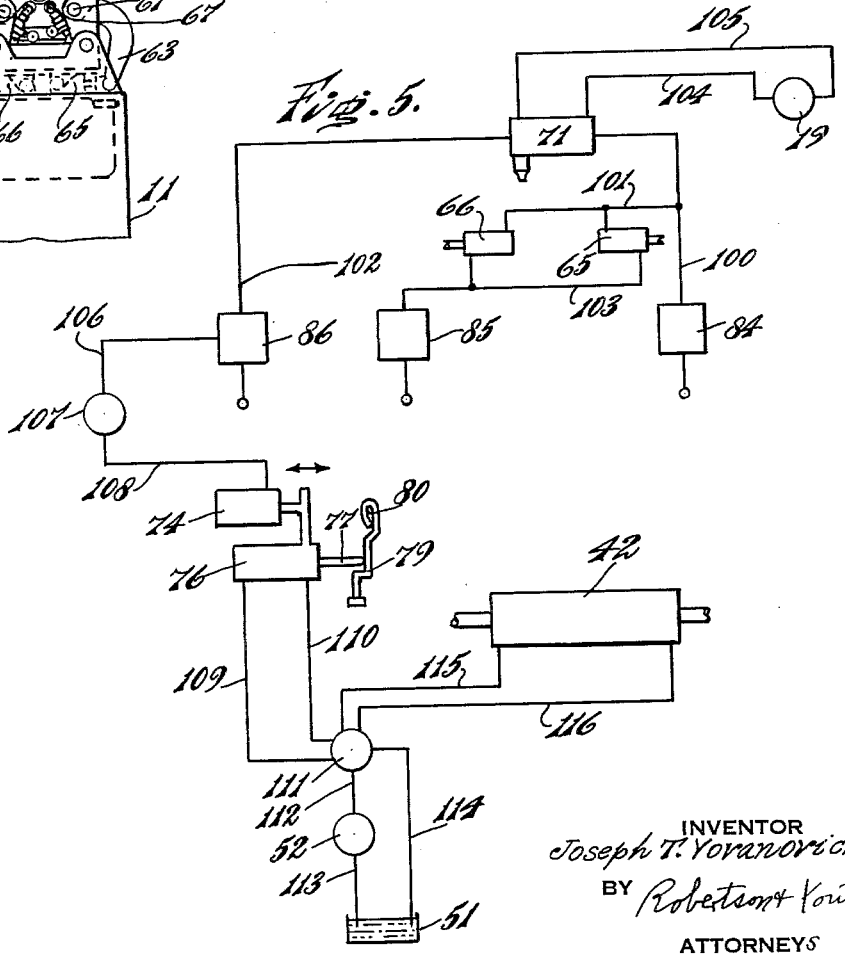
INVENTOR
Joseph T. Yovanovich
BY Robertson & Youtie
ATTORNEYS United States Patent Office 3,229,598
Patented Jan. 18, 1966

3,229,598
METHOD OF MANUFACTURE OF CAN BODIES AND APPARATUS THEREFOR
Joseph T. Yovanovich, Rosemont, Pa., assignor to Pennsylvania Papyrus Corporation, Philadelphia, Pa., a corporation of Pennsylvania
Filed June 3, 1963, Ser. No. 284,982
10 Claims. (Cl. 93—80)

This invention relates to unique improvements in methods of manufacture of can bodies and the like, and embraces new and improved apparatus employed therein.

While the method and apparatus of the present invention have been primarily employed in the manufacture of can bodies, and will be illustrated and described hereinafter with particular reference thereto, it is appreciated that the instant invention is capable of many varied applications, all of which are intended to be comprehended herein.

As is well known to those versed in the art, the continuous winding of tubing, especially of the type employing printed coverings or labels presents considerable difficulty in maintenance of accurate registry of the printed material, as well as in accurate severance of the tubing relative to the printed material. Further, such inaccuracies in conventional, continuously operating equipment are rapidly cumulative, resulting in costly delays for readjustment and defective product.

Heretofore, in the severance of wound tubing into can bodies, it was essential to provide excess material to be trimmed prior to cutting a length of tube into can bodies. This involved special printing, waste of materials, and additional operations.

By the present invention, the provision of this excess trim material, special printing and additional operations is entirely eliminated.

Accordingly, it is an important object of the present invention to provide an automatic can-body manufacturing method and apparatus which overcome the above-mentioned difficulties, being capable of high speed, continuous operation and consistently producing high-quality can bodies in proper register.

It is another object of the present invention to provide a can-body manufacturing method and apparatus having the advantageous characteristics mentioned in the preceding paragraph which is relatively simple in construction, foolproof and automatic in operation, and durable and reliable throughout a long useful life.

Various other more detailed objects and advantages of the invention, such as arise in connection with carrying out the above-noted ideas in a practical embodiment, will in part become apparent and in part be hereinafter stated in the following description of the invention.

In the drawings:

FIGURE 1 is a top plan view showing apparatus constructed in accordance with the present invention in an operative condition of use;

FIGURE 2 is a front elevational view of the apparatus of FIGURE 1;

FIGURE 3 is an end elevational view of the apparatus, as seen from the left-hand end of FIGURE 1;

FIGURE 4 is an end elevational view of the apparatus as seen from the right-hand end of FIGURE 1; and FIGURE 5 is a diagrammatic representation of the control system of the apparatus.

Referring now more particularly to the drawings, and specifically to FIGURES 1-4 thereof, an elongate supporting frame includes a pair of spaced, upstanding end pedestals 10 and 11, respectively at the input and output ends, and having extending therebetween an elevated table or bed 12. Spaced over the bed 12, and extending horizontally inward from the pedestal 10 is a fixed, open-ended, tubular mandrel 14. The mandrel 14 is thus mounted in cantilever fashion, being fixed at one end to the pedestal 10 and extending to a free inner end terminating in spaced relation from the upright or pedestal 11. Mounted on the bed 12, beneath the mandrel 14, for adjustable positioning along the bed is a carriage 15 which supports a cross carriage 16 for movement with the nether carriage 15 and rotation relative thereto about a generally vertical axis transverse of the mandrel 14. Rotation of the cross carriage 16 about its vertical axis may be effected by a feed screw 17 having a manually actuable handle 18, and motorized by a reversible motor 19.

On opposite sides of the mandrel 14, the cross carriage 15 is provided with a pair of subcarriages 20 each provided on its upper side with a horizontal sheave or pulley 21 rotatable about a vertical axis relative to the nether subcarriage 20. The subcarriages 20 may be mounted on the cross carriage 16 for movement therealong by suitable ways 22, which movement may be actuated by a handle 23. An endless belt 24 may be trained about the pulleys 21, with one run extending spirally about the anvil 14, as at 25. The pulleys 21 may be powered by suitable means, such as a motor 26 carried on the underside of the cross carriage 16, and suitable power-transmission means 27 operatively connected between the motor 26 and pulleys. By this means, a plurality of strips, such as 28, 29 and 30 may be helically wound into a tube, as at 31, the helical belt portion 25 extending about the wound strips 28–30 and serving to both rotate the strips about the mandrel 14 and advance the wound material or tubing leftward.

An additional covering strip 32 may also be applied to the wound tubing, being drawn thereabout and wound thereon by the combined axial rotation and longitudinal movement of the tubing.

The tube-winding mechanism thus far described is substantially conventional, and therefore shown only diagrammatically in FIGURE 2 for purposes of clarity.

Adjacent to the discharge end of the table 12 is a laterally extending, upright support 35; and a similar laterally extending upright support 36 may be mounted on the table 12 intermediate the support 35 and the input end stand 10. Suitable horizontal, longitudinally extending ways, such as rods 37, may extend rigidly between the supports 35 and 36. A cutter carriage 38 may be mounted on the ways 37 for reciprocatory movement therealong between the supports 35 and 36. The cutter carriage may include a pair of upstanding, open end frames 40 and 41 movable with the carriage and respectively adjacent to the supports 35 and 36. Further, the frames 40 and 41 and the input and delivery ends, respectively, of the cutter carriage 38, upstand from the carriage transversely thereacross and are centrally open in alignment with the mandrel 14, as will appear presently.

An actuating cylinder-and-piston assembly 42 may be fixed to the inner support 36 extending therefrom longitudinally of the bed or table 12 away from the support 35. Extending from opposite ends of the cylinder assembly 42 may be a pair of rigidly connected piston rods 43 and 44, the former extending toward and fixed to the carriage 38, while the latter extends oppositely toward the upright 10. Projecting horizontally outward from the upright 10, longitudinally of the bed 12, may be a pair of rods 45, serving as guides or ways for a crosshead 46 slidable on the rods. A connecting member or rod 47 extends from the piston rod 44 through the upright or stand 10 and is fixedly secured to the crosshead 46 for moving the latter back and forth along its ways 45 responsive to actuation of the cylinder assembly 42. An additional rod 48 is fixed at one end to the crosshead 46 and extends therefrom in spaced relation entirely through the fixed mandrel 14, carrying at its opposite end a movable mandrel or tube 50. The movable mandrel 50 is in substantially axial alignment with and of a diameter substantially equal to that of the fixed mandrel 14.

It will now be understood that actuation of the cylinder assembly 42 causes reciprocatory movement of the mandrel 50 through the rods 47 and 48, and connecting crosshead 46.

In order to operate the cylinder assembly 42 there is provided a fluid-supply reservoir, such as a tank 51 supported beneath the bed or table 12, a pump 52 and an associated motor 53. Suitable fluid connection is provided between the reservoir 51, pump 52 and cylinder assembly 42, which connections may include suitable valve means, as will appear presently.

Mounted on the cutter carriage 38, along opposite sides thereof are banks of rotary cutters, severing elements or knives 55 and 56, each bank of knives being carried by a respective longitudinal bar 57 and 58. The cutter-carrying bars 57 and 58 are swingably mounted on levers 59 and 60, for movement downward and toward each other about supporting pivots 61 and 62 suitably mounted on the carriage 38. The levers 59 and 60 depend to the lower region of the carriage 38, as at 63 and 64, where they are respectively operatively connected to actuating cylinders 65 and 66. As best seen in FIGURE 3, the cylinders 65 and 66 have their pistons operatively connected to the lower lever ends 63 and 64, respectively, to selectively urge the latter outward and swing the respective banks of cutters 55 and 56 downward and inward toward each other into cutting engagement.

Thus, the wound tubing 31 is fed leftward, as seen in FIGURE 1 through the central opening of the carriage member 41 between the banks of cutters 55 and 56, being there supported on its underside by rollers 67 and 68, or other suitable tube-support means.

The inner or upstream carriage end frame 41 is provided on its upper region with a bracket or mounting member 70 which carries a scanner 71, such as a photoelectric scanner, directed toward the adjacent region of tubing 31.

The delivery end frame 40 of the carriage 38 is provided at its upper region with a support member or mount 72 having a depending portion 73 which carries a generally horizontal piston-and-cylinder assembly 74. A crosshead 75 is associated with the cylinder assembly 74 and shiftable horizontally to the mount 72 longitudinally of the tubing 31. Carried by the crosshead 75 is a transducer 76, such as the linear variable differential transformer type of transducer, having a horizontally movable actuating member or rod 77. The rod 77 may be resiliently biased in the direction toward the input end of the apparatus to a limiting position.

Also depending from the mount 72 over the transducer rod 77 is an arm 78, from which pivotally depends a lever 79. That is, the lever 79 has its upper end pivotally connected at 80 to the arm 78 and depends therefrom to its lower end which carries an engagement member or foot 81. Further, the lever 79 is located in the path of horizontal movement of the transducer rod 77, the rod thus being resiliently urged into end engagement with an intermediate region of the lever 79 tending to swing the latter counterclockwise, as viewed in FIGURE 2, generally toward the input of the apparatus. However, upon actuation of the cylinder assembly 74, the crosshead 75 may be shifted rearward toward the delivery end of the apparatus, carrying with it the transducer 76 and disengaging the transducer rod 77 from the lever 79. The lever 79 may also be spring-biased to swing clockwise as seen in FIGURE 2, and raise its foot 81 upon disengagement of the rod 77 from the lever.

As best seen in FIGURE 1, there may be provided along the bed or table 12 a series of limit switches, shown as three in number and designated 84, 85 and 86, respectively in the direction toward the delivery end of the apparatus. Suitable camming or actuating means, such as a projection 87 may be provided on the carriage for actuating engagement with the limit switches.

A discharge conveyor or delivery belt 90, shown in FIGURE 2 and omitted for clarity in FIGURES 1 and 3, may also be employed. Such a conveyor may include a fixedly positioned, rotatable drive pulley 91, which is driven by a motor 92 through suitable transmission means 93. Idler wheels 94 and 95 may be freely rotatable and fixed relative to the bed 12, while additional idler wheels 96 and 97 may be freely rotatable and carried by the carriage 38 for movement therewith. The belt 90 may be trained about the several wheels or pulleys as shown in FIGURE 2 for continuous rotation in the direction of arrow 98. As is well known, the receiving end of the upper stretch of belt 90 moves with the carriage 38 so as to be always in position to receive tubing material discharged from the delivery end of mandrel 50, which is fixed relative to the carriage and receiving end of the conveyor belt.

Certain hydraulic and electric elements of the instant system are shown diagrammatically in FIGURE 5. It will there be observed that the limit switch 84 is connected to the cylinder assemblies 65 and 66, as by lines 100 and 101, to actuate the cylinder assemblies for cutting tubing 31 between the banks of cutters 55 and 56. Limit switch 85 is similarly connected by lines 102 and 103 to cylinder assemblies 65 and 66 to deactuate the latter and terminate cutting by the knives. Of course, the cylinders 65 and 66 may be electrical, or suitable electric-to-hydraulic conversion employed.

Also, the limit switch 84 is connected to the scanner 71 by line 100 to energize the latter, and limit switch 86 is connected to the scanner by line 102 to deenergize the scanner. Further, the scanner 71 is connected by lines 104 and 105 to correcting motor 19, so that the scanner transmits a correction signal to the motor, the latter responding to rotate the cross carriage 16 in the direction required for appropriate correction of tube-winding angle.

The limit switch 86 may, through the connection 106, actuate a timer 107 which operates the cylinder 74 through supply line 108. In this manner, the carriage actuation of limit switch 86 effects withdrawal, for a period determined by the timer 107, of the transducer 76 away from the lever 79. This permits full extension of the transducer rod or pin 77. The transducer 76 may be connected by lines 109 and 110 to suitable valve means 111, such as an electrical servo valve. The valve 111 is connected in circuit with the pump 52 and reservoir 51, as through connections 112, 113 and 114; and, the valve is further connected through lines 115 and 116 to the cylinder assembly 42.

The valve 111 may therefore control both the direction as well as the speed of movement of piston rods 43 and 44. Further, the output of transducer 76 operates the valve 111. In the illustrated embodiment, full projection of the transducer rod or pin 77 may operate the valve 111 to effect full-speed movement of the piston rods 43 and 44 rightward or toward the input end of the apparatus, while retraction or relative leftward movement of the transducer pin in the transducer housing may suitably control both speed and direction of operation of cylinder assembly 42, and therefore of carriage 38.

In practice, the winding belt 24 may operate continuously, so that tubing 31 is wound continuously and fed leftward while rotating about the anvils 14 and 50. As wound, tubing 31 is provided with external register marks, to which the scanner 71 is sensitive. Upon initial winding of tubing 31, the end may be manually cut at the proper location, whereupon continuous winding and leftward delivery of the tubing proceeds.

With the carriage 38 in a rightward position, the cut end of the continuous tubing engages the shoe of lever 79, which in turn engages the transducer pin or rod 77. The transducer is then operative, through the valve 111, to effect leftward movement of the carriage 38; and further, the transducer and carriage drive means seek a null position wherein carriage speed is exactly equal to axial speed of the tubing 31. This zero relative longitudinal movement between carriage 38 and tubing 31 is quickly achieved, and limit switch 84 actuated to cause cutting action of the tubing within the carriage 38. Simultaneously with commencement of cutting, the scanner 71 is energized to scan register marks about a periphery of the tubing 31 and transmit correction signals to the motor 19.

After cutting is complete, the switch 85 is actuated to remove the cutters 55 and 56, and deenergize the scanner 71. The carriage 38 continues leftward and limit switch 86 is actuated, which effects removal of the transducer 76 from lever 79, and disengagement of the latter from the leading end of the tubing. The direction of carriage movement is thereby reversed, as described hereinbefore, to a rightward starting position for recycling. As the mandrel 50 moves with the carriage 38, the cut tubing 31 is discharged from the latter mandrel upon rightward movement thereof, the shoe 81 being out of the path of cut tubing being discharged, and the conveyor 90 being located to receive and deliver the cut tubing beyond the delivery end of the apparatus. The carriage 38 is then in condition for repetition of the above-described operation.

Thus, with the carriage returned rightward to its starting position, the lowering of the transducer lever 79 is controlled by the timing switch 107 so as to avoid engaging cut can bodies and to insure engagement with the forward edge of the uncut tubing being wound. Upon engagement of the forward edge of the uncut tubing with the transducer lever 79, the tracing mechanism is actuated to move the carriage longitudinally in synchronism with the tube. When this synchronism or zero relative longitudinal velocity between the carriage and tube is obtained, the limit switch 84 is actuated to start operation of the cutters 56 and of the scanner 71. During the cutting operation the carriage continues its synchronized movement relative to the tube and the scanner senses location of the register mark on the tube to transmit a correction signal to the helix-angle correction motor 19.

Upon continued leftward carriage movement, the limit switch 85 is actuated, at a location such that the tubing is completely severed, and the limit switch effects deactuation or removal of the cutters from their cutting position through operation of the cylinders 65 and 66.

The carriage movement continues leftward until the limit switch 86 is actuated, which through cylinder 74 removes the transducer lever 79 from engagement with the tubing, and deactuates the scanner 71. This removal of transducer lever 79 from engagement with the tubing initiates operation of the timer switch 107 to retain the lever in its nonengaging position a predetermined period relative to the winding action of the tubing. Also, this disengagement of the transducer lever 79 from the forward tube edge returns the carriage rightward to its starting position preparatory to repetition of the above-described operating cycle.

The signal of scanner 71 and motor 19 may be associated in a manner providing a given increment of correction for each cycle of operation, so that the winding angle of tubing 31 intermittently seeks that of perfect register. In this way, overcorrection, or correction to an extent likely to impair continuous operation is avoided.

From the foregoing, it is seen that the present invention provides a method and apparatus for automatic manufacture of can bodies, which fully accomplishes its intended objects and is well adapted to meet practical conditions of use.

Although the present invention has been described in some detail by way of illustration and example for purposes of clarity of understanding, it is understood that certain changes and modifications may be made within the spirit of the invention and scope of the appended claims.

What is claimed is:

1. An automatic can-body machine comprising a tube winder for helically winding strip material into tubing and longitudinally discharging the tubing, angle-adjusting means for varying the helix angle of the tubing to insure register, carriage means mounted for movement along the path of discharge of tubing, drive means for driving said carriage means along said path, relative-velocity sensing means carried by said carriage means and located thereon for sensing the relative speed of a precut discharge end of tubing, said sensing means being connected to said drive means for actuating the latter to drive said carriage at the tubing-discharge speed, cutting means carried by said carriage means for cutting tubing during carriage movement with the tubing, scanner means carried by said carriage for scanning register marks of tubing during carriage movement with the tubing, and correction means operatively connected between said scanner means and angle-adjustment means for varying the helix angle to maintain register.

2. An automatic can-body machine according to claim 1, in combination with limit means operative to return said carriage in the direction opposite to tubing discharge after cutting.

3. An automatic can-body machine comprising a tube winder for helically winding strip material into tubing and longitudinally discharging the tubing, angle-adjustment means for varying the helix angle of the tubing to insure register, carriage means mounted for movement along the path of discharge of tubing, drive means for driving said carriage means along said path, relative-velocity sensing means carried by said carriage means for sensing the relative speed of a precut discharge end of tubing, said sensing means being connected to said drive means for actuating the latter to drive said carriage at the tubing-discharge rate, and cutting means carried by said carriage means for cutting tubing during carriage movement with the tubing.

4. An automatic can-body machine according to claim 3, in combination with limit means operative to return said carriage in the direction opposite to tubing discharge upon completion of cutting.

5. An automatic can-body machine comprising a tube winder for helically winding strip material into tubing and longitudinally discharging the tubing, angle-adjustment means for varying the helix angle of tubing to insure register, carriage means for movement along the path of discharge of tubing, drive means for driving said carriage means along said path, relative-velocity sensing means carried by said carriage means for sensing the relative speed of a precut discharge end of tubing, said sensing means being connected to said drive means for actuating the latter to drive said carriage at the tubing-discharge speed, scanner means carried by said carriage for scanning register marks of tubing during carriage movement with the tubing, and correction means operatively connected between said scanner means and angle adjustment means for varying the helix angle to maintain register.

6. An automatic can-body machine according to claim 5, in combination with limit means operable to return said carriage in the direction opposite to tubing discharge after operation of said correction means.

7. An automatic can-body machine comprising a tube winder for helically winding strip material into tubing and longitudinally discharging the tubing, carriage means mounted for movement along the path of discharge of tubing, drive means for driving said carriage means along said path, relative-velocity sensing means carried by said carriage means for sensing the relative speed of a precut discharge end of tubing, said sensing means being connected to said drive means for actuating the latter to drive said carriage at the tubing-discharge speed, and cutting means carried by said carriage means for cutting tubing during carriage movement with the tubing.

8. In the method of manufacturing can bodies, the steps which comprise: continuously helically winding strip material into tubing, longitudinally discharging the tubing by axial spiral rotation, sensing the discharge velocity of tubing at a precut discharge tubing end, cutting said tubing by moving cutters longitudinally with said tubing according to the sensed velocity thereof and radially into said tubing, and scanning register of a periphery of the tubing by moving a scanner longitudinally with the tubing.

9. The method according to claim 8, further characterized in correcting out-of-register by changing the helix angle of winding during winding.

10. In the method of manufacturing can bodies, the steps which comprise: continuously helically winding strip material into tubing, longitudinally discharging the tubing by axial spiral rotation, sensing registry of a periphery of the tube by moving a scanner longitudinally with the tube, correcting out-of-register by changing the helix angle of winding during winding sensing the discharge velocity of said tubing at a precut discharge end of the tubing, and cutting said tubing by moving cutters longitudinally with the tubing according to the sensed velocity thereof.

References Cited by the Examiner
UNITED STATES PATENTS

| | | | |
|---|---|---|---|
| 3,150,574 | 9/1964 | Glasby | 93—80 |
| 3,150,575 | 9/1964 | Couzens et al. | 93—80 |
| 3,158,074 | 11/1964 | Brigham | 93—80 |

FRANK E. BAILEY, *Primary Examiner.*

BERNARD STICKNEY, *Examiner.*